(12) United States Patent
Gaston et al.

(10) Patent No.: US 10,377,555 B2
(45) Date of Patent: *Aug. 13, 2019

(54) FLEXIBLE CONTAINER WITH A SPRAY VALVE

(71) Applicant: Dow Global Technologies LLC, Midland, MI (US)

(72) Inventors: Ryan S. Gaston, Freeport, TX (US); Rashi Tiwari, Missouri City, TX (US); Cristina Serrat, Sugar Land, TX (US); Jeffrey E. Bonekamp, Midland, MI (US); Matthew J. Turpin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/566,319

(22) PCT Filed: Apr. 13, 2016

(86) PCT No.: PCT/US2016/027259
§ 371 (c)(1),
(2) Date: Oct. 13, 2017

(87) PCT Pub. No.: WO2016/168278
PCT Pub. Date: Oct. 20, 2016

(65) Prior Publication Data
US 2018/0086545 A1    Mar. 29, 2018

Related U.S. Application Data

(60) Provisional application No. 62/147,819, filed on Apr. 15, 2015.

(51) Int. Cl.
*B65D 83/00* (2006.01)
*B65D 75/00* (2006.01)
(Continued)

(52) U.S. Cl.
CPC ....... *B65D 83/0061* (2013.01); *B65D 75/008* (2013.01); *B65D 75/5883* (2013.01);
(Continued)

(58) Field of Classification Search
CPC .............. B65D 75/008; B65D 75/5883; B65D 83/0061
(Continued)

(56) References Cited

U.S. PATENT DOCUMENTS

| 566,282 A | 8/1896 | Bailey |
| 821,875 A | 5/1906 | Kneuper |

(Continued)

FOREIGN PATENT DOCUMENTS

| WO | 2010/085979 A1 | 8/2010 |
| WO | 2014/061244 A1 | 9/2016 |

*Primary Examiner* — Jeremy Carroll
(74) *Attorney, Agent, or Firm* — Husch Blackwell LLP

(57) ABSTRACT

The present disclosure provides a flexible container. In an embodiment, the flexible container includes (A) four panels, each panel formed from a flexible multilayer film. The flexible multilayer film is composed of one or more polymeric materials. The four panels form (i) a body, and (ii) a neck. The flexible container includes (B) a fitment. The fitment includes a top portion and a base. The base is composed of a polymeric material. The base is sealed in the neck. The flexible container includes (C) a sleeve and bag-on-valve assembly, or SBoV. The SBoV includes a valve seat, a bladder, and an elastic sleeve. (D) The bladder and the elastic sleeve are inserted through the fitment and are located in the body. (E) The valve seat is attached to the fitment.

14 Claims, 10 Drawing Sheets

(51) Int. Cl.

| | | |
|---|---|---|
| *B65D 75/58* | (2006.01) | |
| *B29C 48/08* | (2019.01) | |
| *B29C 48/10* | (2019.01) | |
| *B29C 48/15* | (2019.01) | |
| *B32B 27/32* | (2006.01) | |
| *C08F 210/16* | (2006.01) | |
| *C08K 3/34* | (2006.01) | |
| *C08L 23/06* | (2006.01) | |
| *C08L 23/16* | (2006.01) | |

(52) U.S. Cl.
CPC .............. *B29C 48/08* (2019.02); *B29C 48/10* (2019.02); *B29C 48/15* (2019.02); *B32B 27/322* (2013.01); *C08F 210/16* (2013.01); *C08J 2303/08* (2013.01); *C08J 2323/06* (2013.01); *C08K 3/346* (2013.01); *C08L 23/06* (2013.01); *C08L 23/16* (2013.01); *C08L 2205/02* (2013.01)

(58) Field of Classification Search
USPC ........................................................ 222/105
See application file for complete search history.

(56) References Cited

U.S. PATENT DOCUMENTS

| | | |
|---|---|---|
| 2,738,227 A | 3/1956 | Walter |
| 2,823,953 A | 2/1958 | McGeorge |
| 3,240,399 A | 3/1966 | Frandeen |
| 3,361,303 A | 1/1968 | Candido |
| 3,672,543 A | 6/1972 | Roper et al. |
| 3,791,557 A | 2/1974 | Venus |
| 3,796,356 A | 3/1974 | Venus |
| 3,961,725 A * | 6/1976 | Clark .................. B65D 83/0061 222/1 |
| 3,981,415 A | 9/1976 | Fowler et al. |
| 4,077,543 A | 3/1978 | Kulikowski et al. |
| 4,222,499 A | 9/1980 | Lee et al. |
| 4,251,032 A | 2/1981 | Werding |
| 4,964,540 A | 10/1990 | Katz |
| 5,111,971 A | 5/1992 | Winer |
| 5,127,554 A | 7/1992 | Loychuk |
| 5,143,260 A * | 9/1992 | Loychuk ............ B65D 83/0061 222/105 |
| 5,232,126 A | 8/1993 | Winer |
| 5,927,551 A | 7/1999 | Taylor et al. |
| 6,413,239 B1 | 7/2002 | Burns et al. |
| 7,086,570 B2 | 8/2006 | Canegallo |
| 8,348,509 B2 * | 1/2013 | Wilkes ................ B65D 75/008 383/10 |
| 8,454,882 B2 | 6/2013 | Chan et al. |
| 8,466,335 B2 | 6/2013 | Klofta et al. |
| 8,505,774 B2 | 8/2013 | Nimmo et al. |
| 8,631,970 B2 | 1/2014 | Chan et al. |
| 8,685,309 B2 | 4/2014 | Klofta et al. |
| 8,752,731 B2 | 6/2014 | Nimmo et al. |
| 9,573,737 B2 * | 2/2017 | Bonekamp ............ B65D 35/28 |
| 2004/0065678 A1 | 4/2004 | Goobers et al. |
| 2005/0178798 A1 | 8/2005 | Canegallo |
| 2006/0243741 A1 | 11/2006 | Schiefer |
| 2009/0045222 A1 | 2/2009 | Nimmo et al. |
| 2011/0056965 A1 | 3/2011 | Peer et al. |
| 2011/0259359 A1 | 10/2011 | Groh et al. |
| 2011/0262550 A1 | 10/2011 | Klofta et al. |
| 2013/0253452 A1 | 9/2013 | Klofta et al. |
| 2014/0061244 A1 | 3/2014 | Kertels |
| 2015/0368438 A1 | 12/2015 | Schwartz et al. |

* cited by examiner

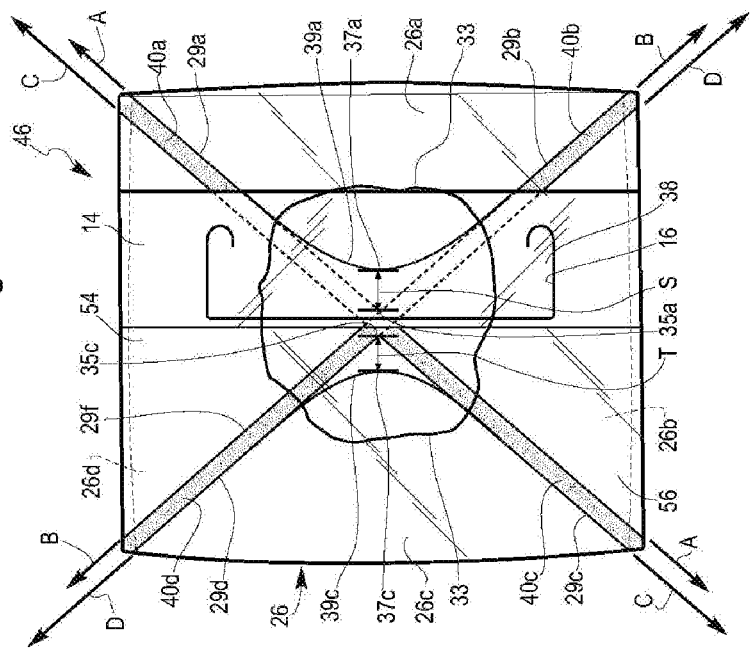
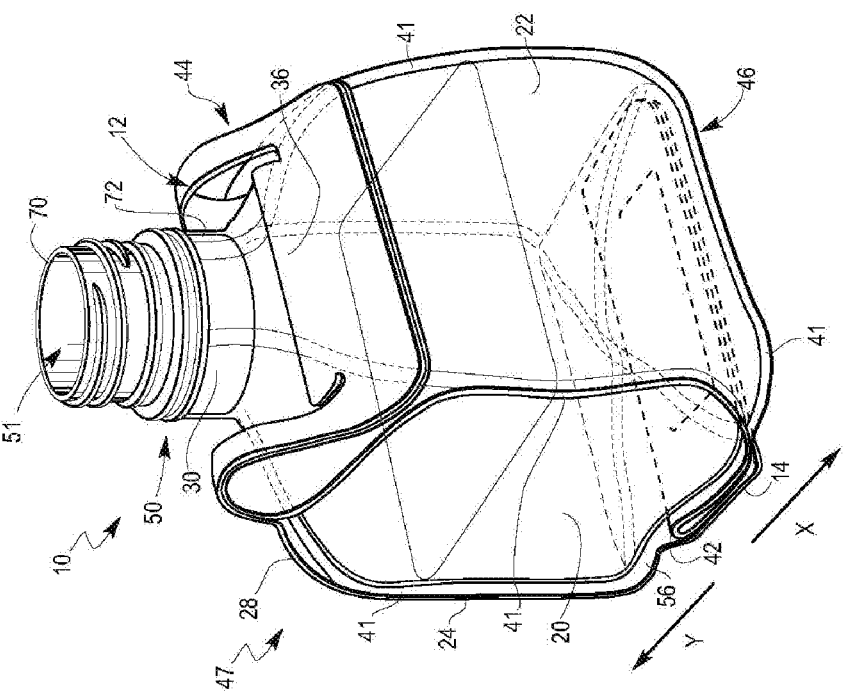

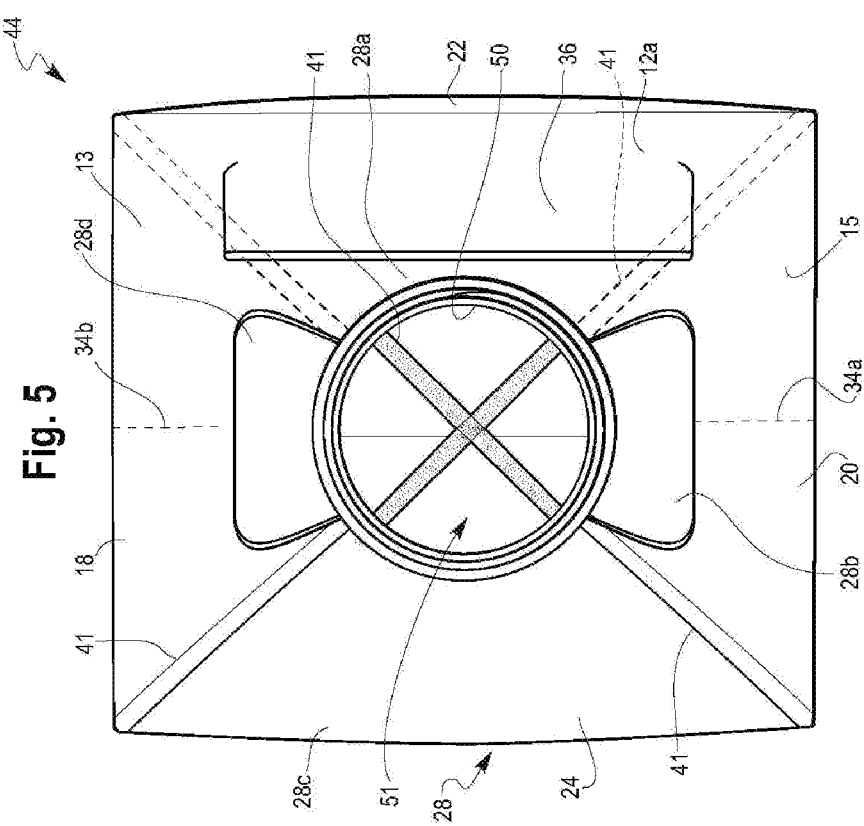

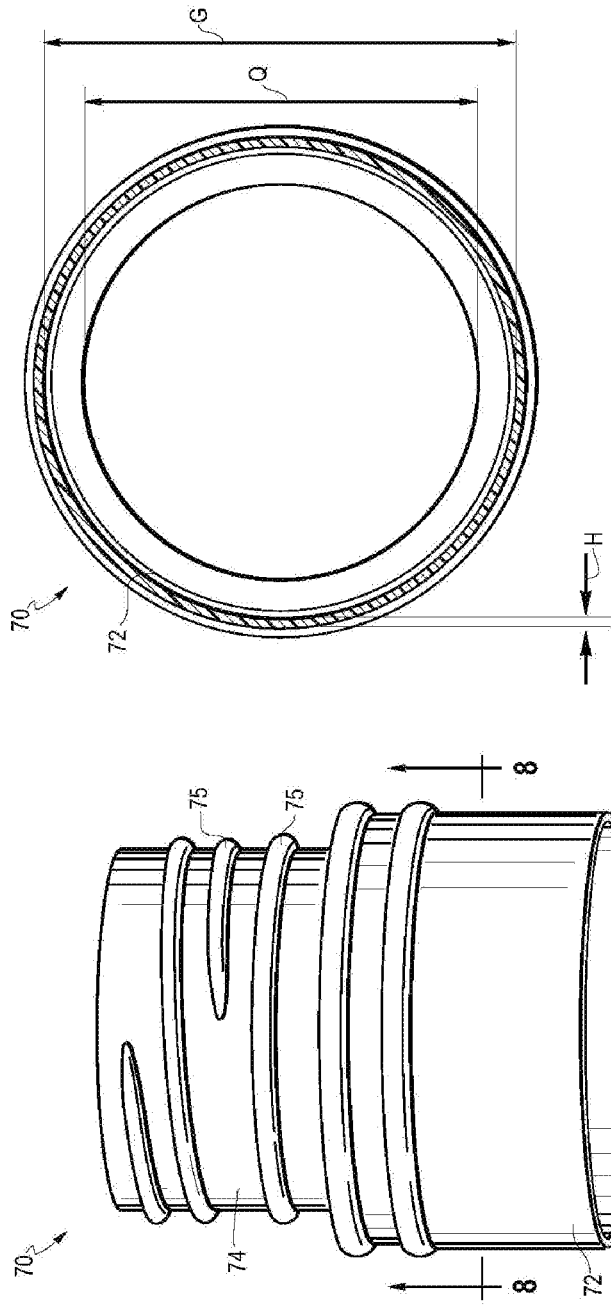

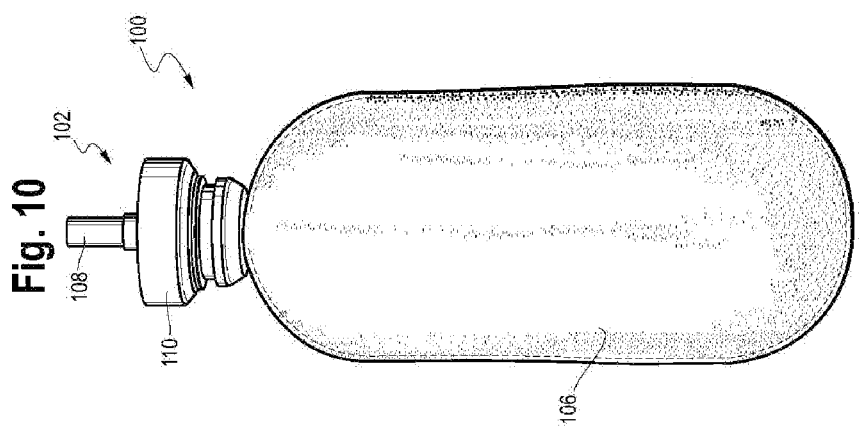
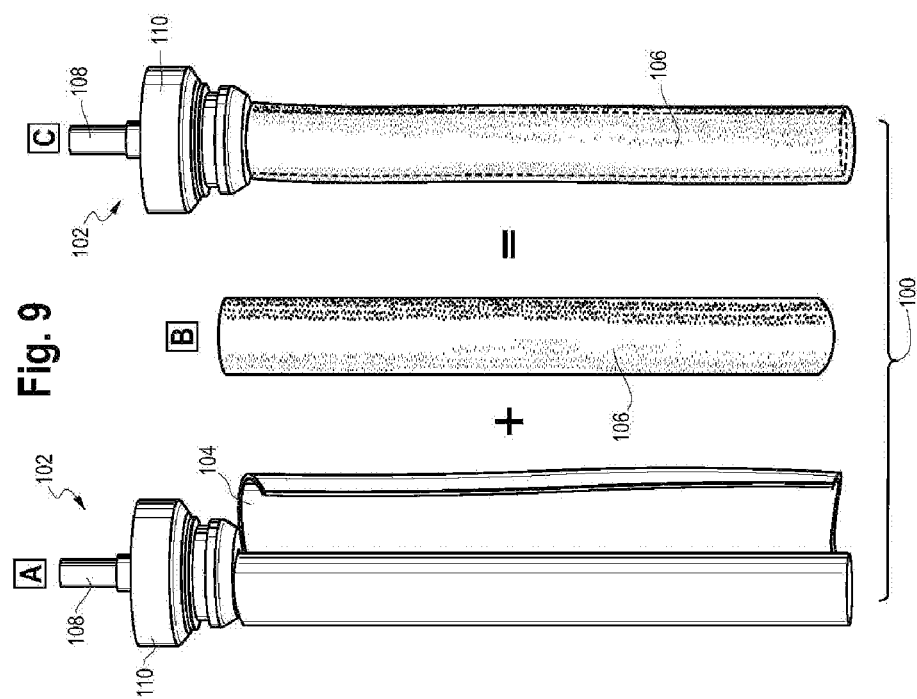

FLEXIBLE CONTAINER WITH A SPRAY VALVE

CROSS-REFERENCE TO RELATED APPLICATIONS

This application claims priority to U.S. Patent Application Ser. No. 62/147,819 filed on 15 Apr. 2015, and the entire content of which is incorporated by reference herein.

BACKGROUND

The present disclosure is directed to a flexible container with a spray valve, and a flexible container with a propellant-free pressurized dispensing system in particular.

Flexible packaging is known to offer significant value and sustainability benefits to product manufacturers, retailers and consumers as compared to rigid, molded plastic packaging or metal containers. Flexible packaging provides many consumer conveniences and benefits, including extended shelf life, easy storage, microwavability and refillability. Flexible packaging has proven to require less energy for creation and creates fewer emissions during disposal.

Flexible packaging includes flexible containers with a gusseted body section. These gusseted flexible containers are currently produced using flexible films which are folded to form gussets and heat sealed in a perimeter shape. The gusseted body section opens to form a flexible container with a square cross section or a rectangular cross section. The gussets are terminated at the bottom of the container to form a substantially flat base, providing stability when the container is partially or wholly filled. The gussets are also terminated at the top of the container to form an open neck for receiving a rigid fitment and closure.

Known are bag-on-valve (BoV) dispensing systems that utilize an elastic sleeve disposed around a fluid-filled inner bag. Actuation of the valve triggers contraction of the elastic sleeve which expels the fluid contents from the bag without a propellant. A drawback of conventional BoV systems is the use of outer enclosures that are rigid, and typically made from rigid plastic, or metal.

A need exists for a flexible container that can spray deliver a fluid composition under pressure. A need further exists for a flexible container that can spray deliver a fluid composition under pressure and also reduce raw material and shipping costs, improve recyclability after product is depleted, and reduce waste volume and disposal costs.

SUMMARY

The present disclosure provides a flexible container with a spray valve for dispensing a fluid composition under pressure and with no propellant. The spray system of the present disclosure can deliver a propellant-free aerosol spray of product.

In an embodiment, a flexible container is provided. The flexible container includes (A) four panels, each panel formed from a flexible multilayer film. The flexible multilayer film is composed of one or more polymeric materials. The four panels form (i) a body, and (ii) a neck. The flexible container includes (B) a fitment. The fitment includes a top portion and a base. The base is composed of a polymeric material. The base is sealed in the neck. The flexible container includes (C) a sleeve and bag-on-valve assembly, or SBoV. The SBoV includes a valve seat, a bladder, and an elastic sleeve. (D) The bladder and the elastic sleeve are inserted through the fitment and are located in the body (or body interior). (E) The valve seat is attached to the fitment.

The present disclosure provides another flexible container. In an embodiment, a flexible container is provided and includes (A) four panels, each panel formed from a flexible multilayer film. The flexible multilayer film is composed of one or more polymeric materials. The four panels form (i) a body, and (ii) a neck. The flexible container includes (B) a fitment. The fitment includes a top portion and a base. The base is composed of a polymeric material. The base is sealed in the neck. The flexible container includes (C) a sleeve and bag-on-valve assembly (SBoV). The SBoV includes a valve seat, a pouch, and an elastic sleeve. (D) The pouch and elastic sleeve are inserted through the fitment and located in the body. (E) The valve seat is composed of a polymeric material. (F) A heat seal attaches the valve seat to the fitment.

BRIEF DESCRIPTION OF THE DRAWINGS

FIG. 1 is a front elevation view of a flexible container in a collapsed configuration in accordance with an embodiment of the present disclosure.

FIG. 2 is an exploded side elevation view of a panel sandwich.

FIG. 3 is a perspective view of the flexible container of FIG. 1 in an expanded configuration and in accordance with an embodiment of the present disclosure.

FIG. 4 is a bottom plan view of the expanded flexible container of FIG. 3 in accordance with an embodiment of the present disclosure.

FIG. 5 is a top plan view of the flexible container of FIG. 3.

FIG. 6 is an enlarged view of Area 6 of FIG. 1.

FIG. 7 is an elevation view of a fitment in accordance with an embodiment of the present disclosure.

FIG. 8 is a bottom plan view of the fitment of FIG. 7.

FIG. 9 is an elevation view of the components for a sleeve and bag-on-valve assembly.

FIG. 10 is the sleeve and bag-on-valve assembly of FIG. 9 with a fluid composition present therein.

DETAILED DESCRIPTION

Figure 11:
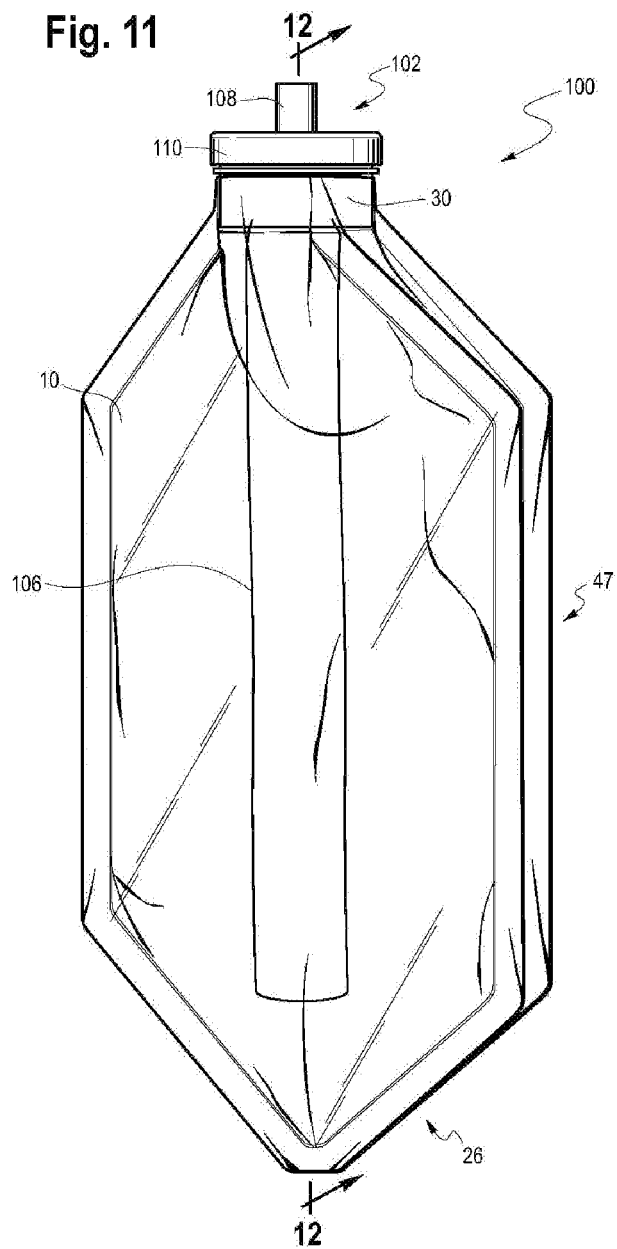
FIG. 11 is a front elevation view of a flexible container with a sleeve and bag-on-valve in a collapsed configuration, in accordance with an embodiment of the present disclosure.

In an embodiment, a flexible container is provided and includes (A) four panels, each panel formed from a flexible multilayer film. The flexible multilayer film is composed of one or more polymeric materials. The four panels form (i) a body, and (ii) a neck. The flexible container includes (B) a fitment. The fitment includes a top portion and a base. The base is composed of a polymeric material. The base is sealed in the neck. The flexible container includes (C) a sleeve and bag-on-valve assembly, or SBoV. The SBoV includes a valve seat, a bladder, and an elastic sleeve. (D) The bladder and the elastic sleeve are inserted through the fitment and are located in the body (or body interior). (E) The valve seat is attached to the fitment.

1. Flexible Container

Figures 1, 2, 6:
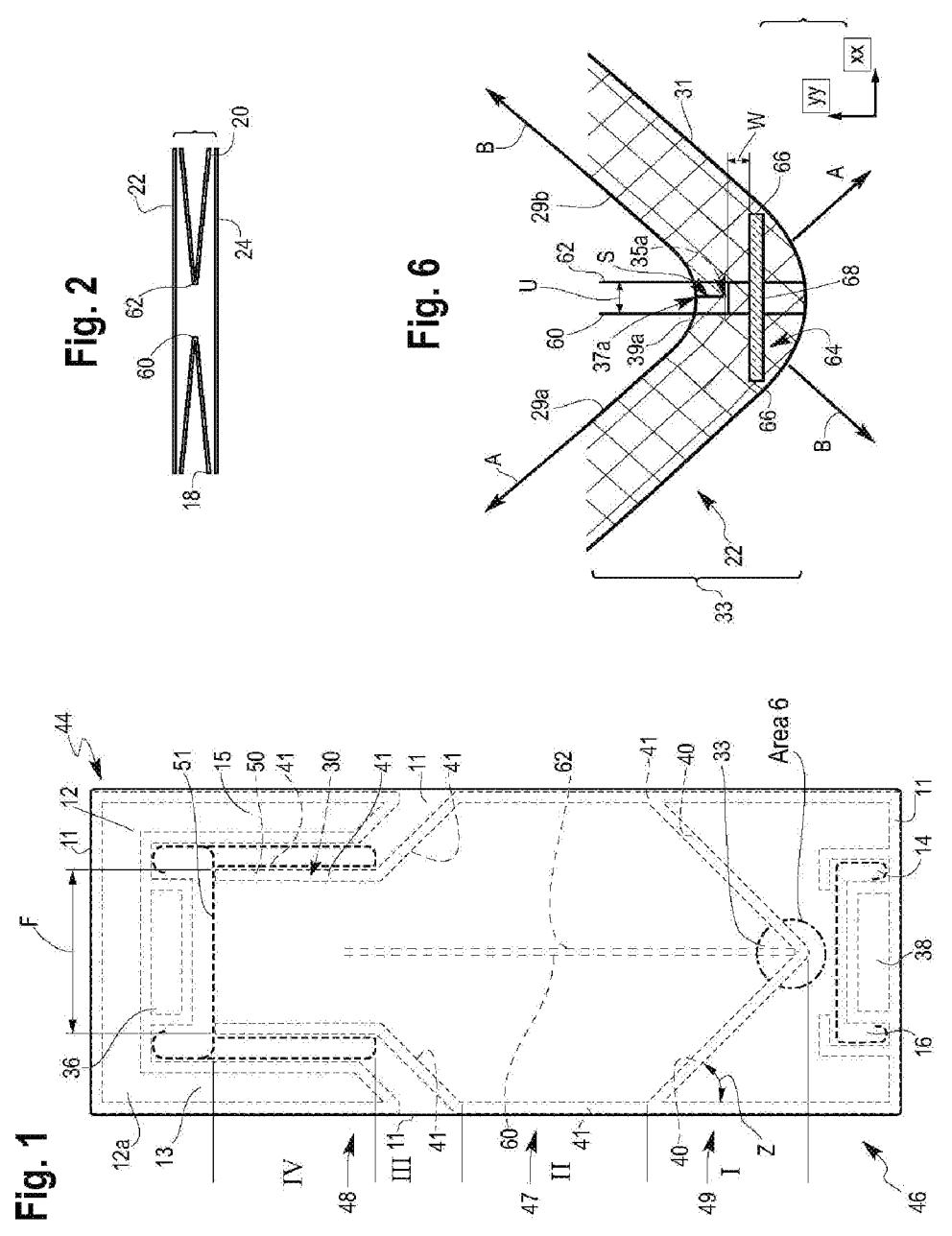

The flexible container includes panels, each panel composed of a flexible multilayer film. The flexible container can be made from two, three, four, five, six, or more panels. In an embodiment, the flexible container 10 has a collapsed configuration (as shown in FIG. 1) and has an expanded configuration (shown in FIGS. 3, 4, 5). FIG. 1 shows the flexible container 10 having a bottom section I, a body section II, a tapered transition section III, and a neck section IV. In the expanded configuration, the bottom section I forms a bottom segment 26, as shown in FIG. 4. The body section II forms a body portion. The tapered transition section III forms a tapered transition portion. The neck section IV forms a neck portion.

In an embodiment, the flexible container 10 is made from four panels, as shown in FIGS. 1-6. During the fabrication process, the panels are formed when one or more webs of film material are sealed together. While the webs may be separate pieces of film material, it will be appreciated that any number of the seams between the webs could be "pre-made," as by folding one or more of the source webs to create the effect of a seam or seams. For example, if it were desired to fabricate the present flexible container from two webs instead of four, the bottom, left center, and right center webs could be a single folded web, instead of three separate webs. Similarly, one, two, or more webs may be used to produce each respective panel (i.e., a bag-in-a-bag configuration or a bladder configuration).

FIG. 2 shows the relative positions of the four webs as they form four panels (in a "one up" configuration) as they pass through the fabrication process. For clarity, the webs are shown as four individual panels, the panels separated and the heat seals not made. The constituent webs form first gusset panel 18, second gusset panel 20, front panel 22 and rear panel 24. The panels 18-24 are a multilayer film as discussed in detail below. The gusset fold lines 60 and 62 are shown in FIGS. 1 and 2.

As shown in FIG. 2, the folded gusset panels 18, 20 are placed between the rear panel 24 and the front panel 22 to form a "panel sandwich." The gusset panel 18 opposes the gusset panel 20. The edges of the panels 18-24 are configured, or otherwise arranged, to form a common periphery 11 as shown in FIG. 1. The flexible multilayer film of each panel web is configured so that the heat seal layers face each other. The common periphery 11 includes the bottom seal area including the bottom end of each panel.

When the flexible container 10 is in the collapsed configuration, the flexible container is in a flattened state, or in an otherwise evacuated state. The gusset panels 18, 20 fold inwardly (dotted gusset fold lines 60, 62 of FIG. 1) and are sandwiched by the front panel 22 and the rear panel 24.

FIGS. 3-5 show flexible container 10 in the expanded configuration. The flexible container 10 has four panels, a front panel 22, a rear panel 24, a first gusset panel 18 and a second gusset panel 20. The four panels 18, 20, 22, and 24 form the body section II and extend toward a top end 44 and extend toward a bottom end 46 of the container 10. Sections III and IV (respective tapered transition section, neck section) form a top segment 28. Section I (bottom section) forms a bottom segment 26.

The four panels 18, 20, 22 and 24 can each be composed of a separate web of film material. The composition and structure for each web of film material can be the same or different. Alternatively, one web of film material may also be used to make all four panels and the top and bottom segments. In a further embodiment, two or more webs can be used to make each panel.

In an embodiment, four webs of film material are provided, one web of film for each respective panel 18, 20, 22, and 24. The process includes sealing edges of each film to the adjacent web of film to form peripheral seals 41 (FIGS. 1, 3, 4, 5) and peripheral tapered seals 40a-40d. The peripheral tapered seals 40a-40d are located on the bottom segment 26 of the container as shown in FIG. 4. The peripheral seals 41 are located on the side edges of the container 10, as shown in FIG. 3. Consequently the process includes forming a closed bottom section I, a closed body section II, and a closed tapered transition section III.

To form the top segment 28 and the bottom segment 26, the four webs of film converge together at the respective end and are sealed together. For instance, the top segment 28 can be defined by extensions of the panels sealed together at the tapered transition section III, and the neck section IV. The top end 44 includes four top panels 28a-28d (FIG. 5) of film that define the top segment 28. The bottom segment 26 can be defined by extensions of the panels sealed together at the bottom section I. The bottom segment 26 can also have four bottom panels 26a-26d of film sealed together and can also be defined by extensions of the panels at the opposite end 46 as shown in FIG. 4.

The neck portion can be located at a corner of the body 47, or in one of the four panels. In an embodiment, the neck 30 is positioned at a midpoint of the top segment 28. The neck 30 may (or may not) be sized smaller than a width of the body section III, such that the neck 30 can have an area that is less than a total area of the top segment 28.

In an embodiment, the neck 30 is formed from two or more panels. In a further embodiment, the neck 30 is formed from four panels.

In an embodiment, the neck 30 is sized to accommodate a wide-mouth fitment. A "wide-mouth fitment," is a fitment having a diameter greater than 50 mm.

Although FIGS. 1 and 3 show the flexible container 10 with a top handle 12 and a bottom handle 14, it is understood the flexible container 10 may be fabricated without handles or with only one handle. When the flexible container 10 has a top handle 12, the neck 30 is located centered on the top segment 28 between the handle bases to facilitate easy dispensing. When the flexible container 10 has a bottom handle 14, the container may be hung upside down for use in an alternate dispensing mode.

The four panels of film that form the flexible container 10 extend from the body section II (forming body 47), to the tapered transition section III (forming tapered transition portion 48), to form a neck 30 (in the neck section IV). The four panels of film also extend from the body section II to the bottom section I (forming bottom portion 49). When the flexible container 10 is in the collapsed configuration (FIG. 1), the neck 30 has a width, F, that is less than the width of the tapered transition section III. The neck 30 includes a neck wall 50. FIGS. 1 and 3 show the neck wall 50 forms an open end 51 for access into the flexible container interior. The panels are sealed together to form a closed bottom section I, a closed body section II, and a closed tapered transition section III. Nonlimiting examples of suitable heating procedures include heat sealing and/or ultrasonic sealing. When the flexible container 10 is in the expanded configuration, the open end 51 of the neck wall 50 is open or is otherwise unsealed. When the flexible container 10 is in the collapsed configuration, the open end 51 is unsealed and is openable. The open end 51 permits access to the container interior through the neck wall 50 and the neck 30, as shown in FIGS. 3 and 5.

As shown in FIGS. 1, 3-4, the flexible bottom handle 14 can be positioned at a bottom end 46 of the container 10 such that the bottom handle 14 is an extension of the bottom segment 26.

Each panel includes a respective bottom face. FIG. 4 shows four triangle-shaped bottom faces 26a-26d, each bottom face being an extension of a respective film panel. The bottom faces 26a-26d make up the bottom segment 26. The four panels 26a-26d come together at a midpoint of the bottom segment 26. The bottom faces 26a-26d are sealed together, such as by using a heat-sealing technology, to form the bottom handle 14. For instance, a weld can be made to form the bottom handle 14, and to seal the edges of the bottom segment 26 together. Nonlimiting examples of suitable heat-sealing technologies include hot bar sealing, hot die sealing, impulse sealing, high frequency sealing, or ultrasonic sealing methods.

FIG. 4 shows bottom segment 26. Each panel 18, 20, 22, 24 has a respective bottom face 26a-26d that is present in the bottom segment 26. Each bottom face is bordered by two opposing peripheral tapered seals 40a-40d. Each peripheral tapered seal 40a-40d extends from a respective peripheral seal 41. The peripheral tapered seals for the front panel 22 and the rear panel 24 have an inner edge 29a-29d (FIG. 4) and an outer edge 31 (FIG. 6). The peripheral tapered seals 40a-40d converge at a bottom seal area 33 (FIGS. 1, 4, 6).

The front panel bottom face 26a includes a first line A defined by the inner edge 29a of the first peripheral tapered seal 40a and a second line B defined by the inner edge 29b of the second peripheral tapered seal 40b. The first line A intersects the second line B at an apex point 35a in the bottom seal area 33. The front panel bottom face 26a has a bottom distalmost inner seal point 37a ("BDISP 37a"). The BDISP 37a is located on the inner edge.

The apex point 35a is separated from the BDISP 37a by a distance S from 0 millimeter (mm) to less than 8.0 mm.

In an embodiment, the rear panel bottom face 26c includes an apex point 35c similar to the apex point 35a on the front panel bottom face 26a. The rear panel bottom face 26c includes a first line C defined by the inner edge of the 29c first peripheral tapered seal 40c and a second line D defined by the inner edge 29d of the second peripheral tapered seal 40d. The first line C intersects the second line D at an apex point 35c in the bottom seal area 33. The rear panel bottom face 26c has a bottom distalmost inner seal point 37c ("BDISP 37c"). The BDISP 37c is located on the inner edge. The apex point 35c is separated from the BDISP 37c by a distance T from 0 millimeter (mm) to less than 8.0 mm.

It is understood the following description to the front panel bottom face 26a applies equally to the rear panel bottom face 26c, with reference numerals to the rear panel bottom face 26c shown in adjacent closed parentheses.

In an embodiment, the BDISP 37a (37c) is located where the inner edges 29a (29c) and 29b (29d) intersect. The distance S (distance T) between the BDISP 37a (37c) and the apex point 35a (35c) is 0 mm.

In an embodiment, the inner seal edge diverges from the inner edges 29a, 29b (29c, 29d), to form an inner seal arc 39a (front panel) and inner seal arc 39c (rear panel) as shown in FIGS. 4 and 6. The BDISP 37a (37c) is located on the inner seal arc 39a (39c). The apex point 35a (apex point 35c) is separated from the BDISP 37a (BDISP 37c) by the distance S (distance T), which is from greater than 0 mm, or 0.5 mm, or 1.0 mm, or 2.0 mm, or 2.6 mm, or 3.0 mm, or 3.5 mm, or 3.9 mm to 4.0 mm, or 4.5 mm, or 5.0 mm, or 5.2 mm, or 5.3 mm, or 5.5 mm, or 6.0 mm, or 6.5 mm, or 7.0 mm, or 7.5 mm, or 7.9 mm.

In an embodiment, apex point 35a (35c) is separated from the BDISP 37a (37c) by the distance S (distance T), which is from greater than 0 mm to less than 6.0 mm.

In an embodiment, the distance S (distance T) from the apex point 35a (35c) to the BDISP 37a (37c) is from greater than 0 mm, or 0.5 mm or 1.0 mm, or 2.0 mm to 4.0 mm or 5.0 mm or less than 5.5 mm.

In an embodiment, apex point 35a (apex point 35c) is separated from the BDISP 37a (BDISP 37c) by the distance S (distance T), which is from 3.0 mm, or 3.5 mm, or 3.9 mm to 4.0 mm, or 4.5 mm, or 5.0 mm, or 5.2 mm, or 5.3 mm, or 5.5 mm.

In an embodiment, the distal inner seal arc 39a (39c) has a radius of curvature from 0 mm, or greater than 0 mm, or 1.0 mm to 19.0 mm, or 20.0 mm.

In an embodiment, each peripheral tapered seal 40a-40d (outside edge) and an extended line from respective peripheral seal 41 (outside edge) form an angle Z as shown in FIG. 1. The angle Z is from 40°, or 42°, or 44°, or 45° to 46°, or 48°, or 50°. In an embodiment, angle Z is 45°.

The bottom segment 26 includes a pair of gussets 54 and 56 formed there at, which are essentially extensions of the bottom faces 26a-26d. The gussets 54 and 56 can facilitate the ability of the flexible container 10 to stand upright. These gussets 54 and 56 are formed from excess material from each bottom face 26a-26d that are joined together to form the gussets 54 and 56. The triangular portions of the gussets 54 and 56 comprise two adjacent bottom segment panels sealed together and extending into its respective gusset. For example, adjacent bottom faces 26a and 26d extend beyond the plane of their bottom surface along an intersecting edge and are sealed together to form one side of a first gusset 54. Similarly, adjacent bottom faces 26c and 26d extend beyond the plane of their bottom surface along an intersecting edge and are sealed together to form the other side of the first gusset 54. Likewise, a second gusset 56 is similarly formed from adjacent bottom faces 26a-26b and 26b-26c. The gussets 54 and 56 can contact a portion of the bottom segment 26, where the gussets 54 and 56 can contact bottom faces 26b and 26d covering them, while bottom segment panels 26a and 26c remain exposed at the bottom end 46.

As shown in FIGS. 3-4, the gussets 54 and 56 of the flexible container 10 can further extend into the bottom handle 14. In the aspect where the gussets 54 and 56 are positioned adjacent bottom segment panels 26b and 26d, the bottom handle 14 can also extend across bottom faces 26b and 26d, extending between the pair of panels 18 and 20. The bottom handle 14 can be positioned along a center portion or midpoint of the bottom segment 26 between the front panel 22 and the rear panel 24.

The top handle 12 and the bottom handle 14 can comprise up to four plys of film sealed together for a four panel container 10. When more than four panels are used to make the container, the handles 12, 14 can include the same number of panels used to produce the container. Any portion of the handles 12, 14 where all four plys are not completely sealed together by the heat-sealing method, can be adhered together in any appropriate manner, such as by a tack seal to form a fully-sealed multilayer handle. Alternatively, the top handle 12 can be made from as few as a single ply of film from one panel only or can be made from only two plies of film from two panels. The handles 12, 14 can have any suitable shape and generally will take the shape of the film end. For example, typically the web of film has a rectangular shape when unwound, such that its ends have a straight edge. Therefore, the handles 12, 14 would also have a rectangular shape.

Additionally, the bottom handle 14 can contain a handle opening 16 or cutout section therein sized to fit a user's hand, as can be seen in FIG. 1. The handle opening 16 can be any shape that is convenient to fit the hand and, in one aspect, the handle opening 16 can have a generally oval shape. In another embodiment, the handle opening 16 can have a generally rectangular shape. Additionally, the handle opening 16 of the bottom handle 14 can also have a flap 38 that comprises the cut material that forms the handle opening 16. To define the handle opening 16, the bottom handle 14 can have a section that is cut out of the multilayer bottom handle 14 along three sides or portions while remaining attached at a fourth side or lower portion. This provides a flap of material 38 that can be pushed through the handle opening 16 by the user and folded over an edge of the handle opening 16 to provide a relatively smooth gripping surface at an edge that contacts the user's hand. If the flap of material 38 were completely cut out, this would leave an exposed fourth side or lower edge that could be relatively sharp and could possibly cut or scratch the hand when placed there.

Furthermore, a portion of the bottom handle 14 attached to the bottom segment 26 can contain a machine fold 42 or a score line that provides for the bottom handle 14 to consistently fold in the same direction, as illustrated in FIG. 3. The machine fold 42 can comprise a fold line that permits folding in a first direction X toward the front side panel 22 and restricts folding in a second direction Y toward the rear panel 24. The term "restricts" as used throughout this application, can mean that it is easier to move in one direction, or the first direction X, than in an opposite direction, such as the second direction Y. The machine fold 42 can cause the bottom handle 14 to consistently fold in the first direction X because it can be thought of as providing a generally permanent fold line in the bottom handle 14 that is predisposed to fold in the first direction X, rather than in the second direction Y. This machine fold 42 of the bottom handle 14 can serve multiple purposes, one being that the container 10 has a more uniform appearance. Secondly, when the flexible container 10 is stored in an upright position, the machine fold 42 in the bottom handle 14 encourages the bottom handle 14 to fold in the first direction X along the machine fold 42, such that the bottom handle 14 can fold underneath the container 10 adjacent one of the bottom segment panels 26a, as shown in FIG. 4. As will be discussed herein, the top handle 12 can also contain a similar machine fold 34a, 34b that also allows it to fold consistently in the same first direction X as the bottom handle 14.

Additionally, as the SBoV in the flexible container 10 is evacuated and less fluid composition remains in the bladder, the bottom handle 14 can continue to provide support to assist the flexible container 10 to remain standing upright unsupported and without tipping over. Because the bottom handle 14 is sealed generally along its entire length extending between the pair of gusset panels 18 and 20, it can help to keep the gussets 54 and 56 (FIG. 3, FIG. 4) together and continue to provide support to stand the container 10 upright even as the container 10 is emptied.

As seen in FIGS. 1, 3, and 5, the top handle 12 can extend from the top segment 28 and, in particular, can extend from the four panels 28a-28d that make up the top segment 28. The four panels 28a-28d of film that extend into the top handle 12 are all sealed together to form a multilayer top handle 12. The top handle 12 can have a U-shape and, in particular, an upside down U-shape with a horizontal upper handle portion 12a having two pairs of spaced legs 13 and 15 extending therefrom. The pair of legs 13 and 15 extend from the top segment 28, adjacent the neck 30.

A portion of the top handle 12 can extend above the neck 30 and above the top segment 28 when the top handle 12 is extended in a position perpendicular to the top segment 28 and, in particular, the entire upper handle portion 12a can be above the neck wall 50 and the top segment 28. The two pairs of legs 13 and 15 along with the upper handle portion 12a together make up the top handle 12 surrounding a handle opening that allows a user to place their hand there through and grasp the upper handle portion 12a of the handle 12.

As with the bottom handle 14, the top handle 12 also can have a dead machine fold 34a, 34b that permits folding in a first direction toward the front side panel 22 and restricts folding in a second direction toward the rear side panel 24, as shown in FIG. 5. The machine fold 34a, 34b can be located in each of the pair of legs 13, 15 at a location where the seal begins. The top handle 12 can be adhered together, such as with a tack adhesive, for example. The machine fold 34a, 34b in the top handle 12 can allow for the top handle 12 to be inclined to fold or bend consistently in the same first direction X as the bottom handle 14, rather than in the second direction Y. As shown in FIGS. 1, 3, and 5, the top handle 12 can likewise contain a flap portion 36 that folds upwards toward the upper handle portion 12a of the top handle 12 to create a smooth gripping surface of the top handle 12, as with the bottom handle 14, such that the handle material is not sharp and can protect the user's hand from getting cut on any sharp edges of the top handle 12.

When the container 10 is in a rest position, such as when it is standing upright on its bottom segment 26, as shown in FIG. 3, the bottom handle 14 can be folded underneath the container 10 along the bottom machine fold 42 in the first direction X, so that it is parallel to the bottom segment 26 and adjacent bottom panel 26a, and the top handle 12 will automatically fold along its machine fold 34a, 34b in the same first direction X, with a front surface of the top handle 12 parallel to a top section or panel 28a of the top segment 28. The top handle 12 folds in the first direction X, rather than extending straight up, perpendicular to the top segment 28, because of the machine fold 34a, 34b. Both handles 12 and 14 are inclined to fold in the same direction X, such that upon dispensing, the handles can fold the same direction, relatively parallel to its respective end panel or end segment, to make dispensing easier and more controlled. Therefore, in a rest position, the handles 12 and 14 are both folded generally parallel to one another. Additionally, the container 10 can stand upright even with the bottom handle 14 positioned underneath the upright container 10.

The flexible container 10 with SBoV also can be supported by the front panel 22, rear panel 24, or a gusset panel 18, 20—i.e., when the flexible container (with SBoV) is standing on either the front panel 22, the rear panel 24, or one of the gusset panels 18, 20. The handles 12, 14 (if present) contribute to stability when the flexible container 10 is in this configuration. In an embodiment, the flexible container (with SBoV) can be designed to stand on a front/rear panel when the front panel 22 or rear panel 24 has an area that is greater than three times the area of the bottom segment 26.

The material of construction of the flexible container 10 can comprise food-grade plastic. For instance, nylon, polypropylene, polyethylene such as high density polyethylene (HDPE) and/or low density polyethylene (LDPE), may be used as discussed later. The film of the plastic container 10 can have a thickness and barrier properties that are adequate to maintain product and package integrity during manufacturing, distribution, product shelf life and customer usage. In an embodiment, the flexible multilayer film has a thickness from 100 micrometers (μm), or 200 μm, or 250 μm to 300 μm, or 350 μm, or 400 μm. In an embodiment, the film material can also be such that it provides the appropriate atmosphere within the flexible container 10 to maintain the product shelf life of at least about 180 days. Such films can comprise an oxygen barrier film, such as a film having a low oxygen transmission rate (OTR) from greater than 0 to 0.4 cc/m$^2$/atm/24 hrs at 23° C. and 80% relative humidity (RH). Additionally, the flexible multilayer film can also comprise a water vapor barrier film, such as a film having a low water vapor transmission rate (WVTR) from greater than 0 to 15 g/m$^2$/24 hrs at 38° C. and 90% RH. Moreover, it may be desirable to use materials of construction having oil and/or chemical resistance particularly in the seal layer, but not limited to just the seal layer. The flexible multilayer film can be either printable or compatible to receive a pressure sensitive label or other type of label for displaying of indicia on the flexible container 10. In an embodiment, the film can also be made of non-food grade resins for producing containers for materials other than food.

In an embodiment, each panel is made from a flexible multilayer film having at least one, or at least two, or at least three layers. The flexible multilayer film is resilient, flexible, deformable, and pliable. The structure and composition of the flexible multilayer film for each panel 18, 20, 22, 24 may be the same or different. For example, each of the four panels 18, 20, 22, 24 can be made from a separate web, each web having a unique structure and/or unique composition, finish, or print. Alternatively, each of the four panels 18, 20, 22, 24 can be the same structure and the same composition.

In an embodiment, each panel 18, 20, 22, 24 is a flexible multilayer film having the same structure and the same composition.

The flexible multilayer film may be (i) a coextruded multilayer structure or (ii) a laminate, or (iii) a combination of (i) and (ii). In an embodiment, the flexible multilayer film has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or ten, or eleven, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

The flexible multilayer film is composed of one or more polymeric materials. Nonlimiting examples of suitable polymeric materials for the seal layer include olefin-based polymer (including any ethylene/$C_3$-$C_{10}$ α-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene (HDPE), low density polyethylene (LDPE), linear low density polyethylene (LLDPE), medium density polyethylene (MDPE)), ethylene-acrylic acid or ethylene-methacrylic acid and their ionomers with zinc, sodium, lithium, potassium, magnesium salts, ethylene vinyl acetate copolymers, and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like), propylene-based plastomers (e.g., VERSIFY™ or VISTAMAX™)), polyamides (such as Nylon 6; Nylon 6,6; Nylon 6,66; Nylon 6,12; Nylon 12; etc.), polyethylene norbornene, cyclic olefin copolymers, polyacrylonitrile, polyesters, copolyesters (such as polyethylene terephthalate glycol-modified (PETG)), cellulose esters, polyethylene and copolymers of ethylene (e.g., LLDPE based on ethylene octene copolymer such as DOWLEX™, blends thereof, and multilayer combinations thereof.

Nonlimiting examples of suitable polymeric materials for the tie layer include functionalized ethylene-based polymers such as ethylene-vinyl acetate (EVA) copolymer, polymers with maleic anhydride-grafted to polyolefins such as any polyethylene, ethylene-copolymers, or polypropylene, and ethylene acrylate copolymers such an ethylene methyl acrylate (EMA) copolymer, glycidyl containing ethylene copolymers, propylene and ethylene based olefin block copolymers (OBC) such as INTUNE™ (PP-OBC) and INFUSE™ (PE-OBC) both available from The Dow Chemical Company, and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN™ resins available from The Dow Chemical Company); vinylethylene vinyl alcohol (EVOH) copolymer, and metal foil (such as aluminum foil). Alternatively, modified polymeric films such as vapor deposited aluminum or silicon oxide on such films as BON, OPET, or oriented polypropylene (OPP), can be used to obtain barrier properties when used in laminate multilayer film.

In an embodiment, the flexible multilayer film includes a seal layer selected from LLDPE (sold under the trade name DOWLEX™ (The Dow Chemical Company)); single-site LLDPE (substantially linear, or linear ethylene alpha-olefin copolymers, including polymers sold under the trade name AFFINITY™ or ELITE™ (The Dow Chemical Company)

for example); propylene-based plastomers or elastomers such as VERSIFY™ (The Dow Chemical Company); and blends thereof. An optional tie layer is selected from either ethylene-based olefin block copolymer PE-OBC (sold as INFUSE™) or propylene-based olefin block copolymer PP-OBC (sold as INTUNE™). The outer layer includes greater than 50 wt % of resin(s) having a melting point, Tm, that is from 25° C., to 30° C., or 40° C. higher than the melting point of the polymer in the seal layer wherein the outer layer polymer is selected from resins such as VERSIFY™ or VISTAMAX™, ELITE™, HDPE or a propylene-based polymer such as propylene homopolymer, propylene impact copolymer or TPO.

In an embodiment, the flexible multilayer film is co-extruded.

In an embodiment, flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example), propylene-based plastomers or elastomers such as VERSIFY™ (The Dow Chemical Company), and blends thereof. The flexible multilayer film also includes an outer layer that is a polyamide.

In an embodiment, the flexible multilayer film is a coextruded film and includes:

(i) a seal layer composed of an olefin-based polymer having a first melt temperature less than 105° C., (Tm1); and
  (ii) an outer layer composed of a polymeric material having a second melt temperature, (Tm2),
  wherein Tm2−Tm1>40° C.

The term "Tm2−Tm1" is the difference between the melt temperature of the polymer in the outer layer and the melt temperature of the polymer in the seal layer, and is also referred to as "ΔTm." In an embodiment, the ΔTm is from 41° C., or 50° C., or 75° C., or 100° C. to 125° C., or 150° C., or 175° C., or 200° C.

In an embodiment, the flexible multilayer film is a coextruded film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cm$^3$, or from 0.875 to 0.910 g/cm$^3$, or from 0.888 to 0.900 g/cm$^3$ and the outer layer is composed of a polyamide having a Tm from 170° C. to 270° C.

In an embodiment, the flexible multilayer film is a coextruded and/or laminated film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and a density from 0.865 to 0.925 g/cm$^3$, or from 0.875 to 0.910 g/cm$^3$, or from 0.888 to 0.900 g/cm$^3$ and an outermost layer composed of a material selected from LLDPE, OPET, OPP (oriented polypropylene), BOPP, polyamide, and combinations thereof.

In an embodiment, the flexible multilayer film is a coextruded and/or laminated film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm$^3$, or from 0.875 to 0.910 g/cm$^3$, or from 0.888 to 0.900 g/cm$^3$. The outer layer is composed of a material selected from LLDPE, OPET, OPP (oriented polypropylene), BOPP, polyamide, and combinations thereof.

In an embodiment, the flexible multilayer film is a coextruded (or laminated) five layer film, or a coextruded (or laminated) seven layer film having at least two layers containing an ethylene-based polymer. The ethylene-based polymer may be the same or different in each layer.

In an embodiment, the flexible multilayer film includes a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a heat seal initiation temperature (HSIT) from 65° C. to less than 125° C. Applicant discovered that the seal layer with an ethylene-based polymer with a HSIT from 65° C. to less than 125° C. advantageously enables the formation of secure seals and secure sealed edges around the complex perimeter of the flexible container. The ethylene-based polymer with HSIT from 65° C. to less than 125° C. is a robust sealant which also allows for better sealing to the rigid fitment which is prone to failure. The ethylene-based polymer with HSIT from 65° C. to 125° C. enables lower heat sealing pressure/temperature during container fabrication. Lower heat seal pressure/temperature results in lower stress at the fold points of the gusset, and lower stress at the union of the films in the top segment and in the bottom segment. This improves film integrity by reducing wrinkling during the container fabrication. Reducing stresses at the folds and seams improves the finished container mechanical performance. The low HSIT ethylene-based polymer seals at a temperature below what would cause the outer layer to be compromised.

In an embodiment, the flexible multilayer film is a coextruded and/or laminated five layer, or a coextruded (or laminated) seven layer film having at least one layer containing a material selected from LLDPE, OPET, OPP (oriented polypropylene), BOPP, and polyamide.

In an embodiment, the flexible multilayer film is a coextruded and/or laminated five layer, or a coextruded (or laminated) seven layer film having at least one layer containing OPET or OPP.

In an embodiment, the flexible multilayer film is a coextruded (or laminated) five layer, or a coextruded (or laminated) seven layer film having at least one layer containing polyamide.

In an embodiment, the flexible multilayer film is a seven-layer coextruded (or laminated) film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a Tm from 90° C. to 106° C. The outer layer is a polyamide having a Tm from 170° C. to 270° C. The film has a ΔTm from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

FIG. 6 shows an enlarged view of the bottom seal area 33 (Area 6) of FIG. 1 and the front panel 26a. The fold lines 60 and 62 of respective gusset panels 18, 20 are separated by a distance U that is from 0 mm, or greater than 0 mm, or 0.5 mm, or 1.0 mm, or 2.0 mm, or 3.0 mm, or 4.0 mm, or 5.0 mm to 12.0 mm, or greater than 60.0 mm (for larger containers, for example). In an embodiment, distance U is from greater than 0 mm to less than 6.0 mm. FIG. 6 shows line A (defined by inner edge 29a) intersecting line B (defined by inner edge 29b) at apex point 35a. BDISP 37a is on the distal inner seal arc 39a. Apex point 35a is separated from BDISP 37a by a distance S having a length from greater than 0 mm, or 1.0 mm, or 2.0 mm, or 2.6 mm, or 3.0 mm, or 3.5 mm, or 3.9 mm to 4.0 mm, or 4.5 mm, or 5.0 mm, or 5.2 mm, or 5.5 mm, or 6.0 mm, or 6.5 mm, or 7.0 mm, or 7.5 mm, or 7.9 mm.

In FIG. 6, an overseal 64 is formed where the four peripheral tapered seals 40a-40d converge in the bottom seal area 33. The overseal 64 includes 4-ply portions 66, where a portion of each panel is heat sealed to a portion of every other panel. Each panel represents 1-ply in the 4-ply heat seal. The overseal 64 also includes a 2-ply portion 68 where two panels (front panel 22 and rear panel 24) are sealed together. Consequently, the "overseal," as used herein, is the area where the peripheral tapered seals 40a-40d converge that is subjected to a subsequent heat seal operation (and subjected to at least two heat seal operations altogether). The overseal 64 is located in the peripheral tapered seals 40a-40d and does not extend into the chamber of the flexible container 10.

In an embodiment, the apex point 35a is located above the overseal 64. The apex point 35a is separated from, and does not contact the overseal 64. The BDISP 37a is located above the overseal 64. The BDISP 37a is separated from and does not contact the overseal 64.

In an embodiment, the apex point 35a is located between the BDISP 37a and the overseal 64, wherein the overseal 64 does not contact the apex point 35a and the overseal 64 does not contact the BDISP 37a.

The distance between the apex point 35a to the top edge of the overseal 64 is defined as distance W, shown in FIG. 6. In an embodiment, the distance W has a length from 0 mm, or greater than 0 mm, or 2.0 mm, or 4.0 mm to 6.0 mm, or 8.0 mm, or 10.0 mm or 15.0 mm.

When more than four webs are used to produce the container, the portion 68 of the overseal 64 may be a 4-ply, or a 6-ply, or an 8-ply portion.

In an embodiment, the flexible container 10 has a vertical drop test pass rate from 90%, or 95% to 100%. The vertical drop test is conducted as follows. The flexible container 10 is filled with tap water to its nominal capacity, conditioned at 25° C. for at least 3 hours, held in upright position from its top handle 12 at 1.5 m height (from the base or side of the container to the ground), and released to a free fall drop onto a concrete slab floor. If any leak is detected immediately after the drop, the test is recorded as a failure. A minimum of twenty flexible containers are tested. A percentage for pass/fail containers is then calculated.

In an embodiment, the flexible container 10 has a side drop pass rate from 90%, or 95% to 100%. This side drop test is conducted as follows. The container is filled with tap water to its nominal capacity, conditioned at 25° C. for at least 3 hours, held in upright position from its top handle 12. The flexible container 10 is released on its side from a 1.5 m height to a free fall drop onto a concrete slab floor. If any leak is detected immediately after the drop, the test is recorded as failure. A minimum of twenty flexible containers are tested. A percentage for pass/fail containers is then calculated.

In an embodiment, the flexible container 10 passes the stand-up test where the package is filled with water at ambient temperature and placed on a flat surface for seven days and it should remain in the same position, with unaltered shape or position.

In an embodiment, the flexible container 10 has a volume from 0.050 liters (L), or 0.1 L, or 0.15 L, or 0.2 L, or 0.25 L, or 0.5 L, or 0.75 L, or 1.0 L, or 1.5 L, or 2.5 L, or 3 L, or 3.5 L, or 3.75 L, or 4.0 L, or 4.5 L, or 5.0 L to 6.0 L, or 7.0 L, or 8.0 L, or 9.0 L, or 10.0 L, or 20 L, or 30 L.

2. Fitment

In an embodiment, the flexible container includes a fitment 70 inserted into the neck 30 of the flexible container 10. The fitment 70 includes a base 72 and a top portion 74 as shown in FIG. 7. The fitment 70 is composed of one or more polymeric materials. The base 72 and the top portion 74 may be made from the same polymeric material or from different polymeric materials. In an embodiment, the base 72 and the top portion 74 are made from the same polymeric material.

The top portion 74 may include threads 75 or other suitable structure for attachment to a valve providing closure to the container. Nonlimiting examples of suitable fitments include threaded fitment or fitment having a lip with an outside undercut for snap closure of the valve, or other suitable cylindrical fitment for attaching to the SBoV. The valve and/or fitment may or may not include a gasket.

In an embodiment, the top portion 74 has a circular cross section with a diameter Q suitable to attach the SBoV. In an embodiment, the top portion diameter Q is 15 mm, or 17 mm, or 18 mm, or 19 mm, or 20 mm, or 21 mm, or 22 mm, or 23 mm, or 24 mm, or 25 mm, or 26 mm or 27 mm, or 28 mm, or 30 mm, or 35 mm. In an embodiment, the top portion diameter Q is from 15 mm, or 20 mm, or 25 mm to 30 mm, or 35 mm, or 40 mm, or 45 mm, or 50 mm, or 60 mm, or 70 mm. In an embodiment, the wall thickness of the top portion of the fitment is from 0.2 mm, or 0.3 mm, or 0.5 mm, or 0.75 mm to 1.0 mm, or 1.5 mm or 1.75 mm, or 2 mm.

The base 72 has a cross sectional shape. The cross sectional shape of the base 72 is selected from ellipse, circle, and regular polygon.

In an embodiment, the cross-sectional shape of the base 72 is an ellipse. An "ellipse," as used herein, is a plane curve such that the sums of the distances of each point in its periphery from two fixed points, the foci, are equal. The ellipse has a center which is the midpoint of the line segment linking the two foci. The ellipse has a major axis (the longest diameter through the center). The minor axis is the shortest line through the center. The ellipse center is the intersection of the major axis and the minor axis. As used herein, the diameter (d) for the ellipse is the major axis.

In an embodiment, the cross-sectional shape is slightly elliptical where the ratio of major axis to minor axis is between 1.01 to 1.25.

In an embodiment, the cross-sectional shape for the base is a circle (or is substantially a circle). A "circle," as used herein, is a closed plane curve consisting of all points at a given distance from a point within it called the center. The radius (r) for the circle is the distance from the center of the circle to any point on the circle. The diameter (d) for the circle is 2r.

In an embodiment, the cross sectional shape for the base is a regular polygon. A "polygon," as used herein, is a closed plane figure, having three or more, straight, sides. The point where two sides meet is a "vertex." A "regular polygon," as used herein, is a polygon that is equiangular (all angles are equal in measure) and equilateral (all sides have the same length. The radius (r) for a regular polygon is defined by Formula (1) below.

$$\text{radius} = \frac{s}{2\sin\left(\frac{\pi}{n}\right)} \quad \text{Formula (1)}$$

wherein
s is the length of any side;
n is the number of sides; and
sin is the sine function.

The diameter (d) for a regular polygon is 2(r) wherein the radius, r, for the regular polygon is determined by way of Formula (1). Nonlimiting examples of suitable regular polygon shapes for the cross-section of the base 72 include equilateral triangular, regular square, regular pentagon, regular hexagon, regular heptagon, regular octagon, regular nonagon, regular decagon, regular hendecagon, or regular dodecagon shape.

The cross-sectional shape of the top portion 74 may be the same or different than the cross-sectional shape of the base 72.

The cross-sectional shape of the base 72 may be circular, slightly elliptical, or regular polygonal. In an embodiment, the cross-sectional shape of the base 72 is circular, or substantially circular, as shown in FIGS. 7 and 8.

The base 72 may or may not include canoe-shaped fitment base or a base having opposing radial fins.

In an embodiment, the fitment 70 excludes fitments with a canoe-shaped base, fitments with a base that has radial fins, fitments with a wing-shaped base, and fitments with an eye-shaped base. In this embodiment, the base 72 with a circular or regular polygon cross-sectional shape is distinct from fitments with a canoe-shaped fitment base or fitments with a base having opposing radial fins.

The outer surface of the base 72 may or may not include surface texture. In an embodiment, the outer surface of the base 72 has surface texture. Nonlimiting examples of surface texture include embossment, and a plurality of radial ridges to promote sealing to the inner surface of the neck wall 50.

In an embodiment, the outer surface of base 72 is smooth and does not include surface texture, as shown in FIG. 7.

In an embodiment, the diameter of the base 72 is greater than the diameter of the top portion 74. FIG. 8 shows base 72 with circle cross-sectional shape and the diameter of base 72 is G having a length that is greater than the length of the diameter Q the diameter of the top portion 74. Alternatively, in another embodiment the base 72 has a diameter equal to or less than the diameter of the top portion 74 when the valve for the SBoV requires a larger top portion diameter.

The base 72 is welded, or is otherwise heat sealed to the multilayer film that forms the neck 30. In other words, the base 72 is welded to the neck 30. Heat sealing can be made by means of hot bar, impulse seal, ultrasonic or in some cases by high frequency (HF) sealing.

The fitment 70 is made from a polymeric material. Nonlimiting examples of suitable polymeric materials include propylene-based polymer, ethylene-based polymer, polyamides (such as Nylon 6; Nylon 6,6; Nylon 6,66; Nylon 6,12; Nylon 12; and the like), cyclic olefin copolymers (COC, such as TOPAS™ or APEL™), polyesters (crystalline and amorphous), copolyester resin (such as PETG), cellulose esters (such as polylactic acid (PLA)), and combinations thereof.

In an embodiment, the fitment 70 is made from an ethylene/α-olefin multi-block copolymer. Nonlimiting examples of suitable ethylene/α-olefin multi-block copolymer include polymers sold under the trade name INFUSE™ available from The Dow Chemical Company.

In an embodiment, the base 72 has a diameter (d) and a wall thickness (WT) as shown in FIG. 8. In FIG. 8, the base 72 diameter (d) is shown as distance G and the wall thickness (WT) is shown as the distance H. The base 72 diameter (d) can be uniform or can vary along the length of the base 72. Similarly, the wall thickness (WT) can be uniform or can vary along the length of the base 72.

In an embodiment, the diameter of the base 72 is uniform along the base length and the wall thickness (WT) is uniform along the base length.

In an embodiment, the base 72 has a diameter (d) from 5 mm, or 10 mm, or 12.5 mm, or 15 mm, or 18 mm, or 20 mm, or 23 mm or 25 mm, or 27 mm, or 30 mm to 35 mm, or 38 mm, or 40 mm, or 45 mm, or 47 mm, or 50 mm, or 60 mm, or 70 mm.

In an embodiment, the base 72 has a wall thickness (WT) from 0.15 mm, or 0.2 mm, or 0.3 mm, or 0.4 mm, or 0.5 mm, or 0.6 mm, or 0.7 mm, or 0.75 mm, or 0.8 mm, or 0.9 mm, or 1.0 mm to 1.3 mm, or 1.5 mm, or 1.7 mm, or 1.9 mm, or 2.0 mm.

In an embodiment, the base 72 has a wall thickness (WT) from 0.15 mm, or 0.2 mm, or 0.3 mm, or 0.4 mm to 0.5 mm, or 0.6 mm, or 0.7 mm, or 0.75 mm. As used herein, a base wall thickness (WT) with the foregoing wall thickness from 0.15 mm to 0.75 mm is a "thin-wall."

The base 72 has a diameter to wall thickness ratio. The "diameter to wall thickness ratio" (denoted as "d/WT") is the diameter (d) of the base 72 (in millimeters, mm) divided by the wall thickness (WT), in mm, of the base 72. In an embodiment, the base 72 has a d/WT from 5, or 8, or 10, or 12.5, or 15, or 20, or 30, or 40, or 50, or 60, or 70, or 80, or 90, or 100, or 125, or 150, or 175, or 200 to 300, or 350, or 400, or 450.

In an embodiment, the base 72 has a d/WT from 35, or 40, or 50, or 60, or 70, or 80, or 90, or 100, or 125, or 150, or 175 to 200, or 225, or 250, or 275 to 300, or 325, or 350, or 375, or 400, or 425, or 450.

In an embodiment, the base 72 has a d/WT ratio from 13 to 333, the diameter (d) is from 10 mm, or 12.5 mm, or 15 mm, or 18 mm, or 20 mm, or 23 mm, or 25 mm, or 27 mm, or 30 mm to 35 mm, or 38 mm, or 40 mm, or 45 mm, or 47 mm, or 50 mm and the wall thickness (WT) is from 0.15 mm, or 0.2 mm, or 0.3 mm, or 0.4 mm to 0.5 mm, or 0.6 mm, or 0.7 mm, or 0.75 mm. Thus, the base 72 has a thin-wall structure.

In an embodiment, the base 72 has a d/WT ratio from 20 to 267 as disclosed above. The diameter (d) for the base 72 is from 15 mm to 40 mm. The wall thickness (WT) for the base 72 is from 0.15 mm to 0.75 mm. Thus, the base 72 has a thin-wall structure.

In an embodiment, the base 72 has a d/WT ratio from 26 to 150, as disclosed above. The diameter (d) for the base 72 is from 20 mm to 30 mm. The wall thickness (WT) for the base 72 is from 0.2 mm to 0.75 mm. Thus, the base 72 has a thin-wall structure.

The fitment 70 with a d/WT from 35 to 450 can include a base 72 with a thin-wall structure. Thin-wall fitments advantageously reduce production costs, reduce material cost, and reduce the weight of the final flexible container 10. The top portion 74 can have the same wall thickness (i.e., the same "thin wall" thickness) as the base 72.

3. Sleeve and Bag-On-Valve Assembly

The present flexible container includes a sleeve and bag-on-valve assembly (or "SBoV") 100. As shown in FIG. 9, the SBoV includes a valve assembly structure 102, a bladder 104, and an elastic sleeve 106. The valve assembly structure 102 includes a valve 108 and a valve seat 110. The valve 108 can in turn include a value stem, a valve housing, gasketing and/or a spring. The valve assembly structure 102 holds valve 108 and attaches the valve seat 110 to the bladder 104 either on the valve seat 110 or on a valve plug or insert that connects to the valve seat 110. The value assembly structure 102 provides fluid communication between the bladder interior and the valve 108. As shown in FIG. 9, the bladder 104 is empty and partially rolled upon itself below the valve seat 110. In an embodiment, the valve assembly structure 102 includes a spring (not shown) holding the valve 108 closed for when the valve 108 is a "press down" valve. When the valve 108 is pressed against the spring a pathway is opened, enabling a fluid composition (pressurized by way of the elastic sleeve 106) to flow through, and out of, the valve 108.

Figure 13:
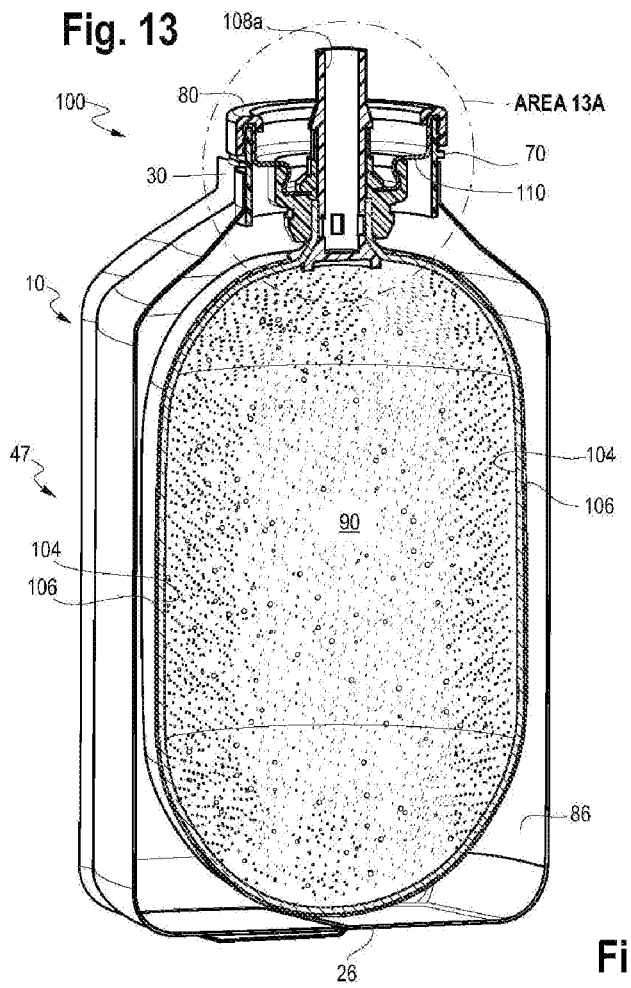
FIG. 13 is a sectional view of the flexible container of FIG. 12 with a fluid composition present in the sleeve and bag-on-valve assembly.
Figure 13A:
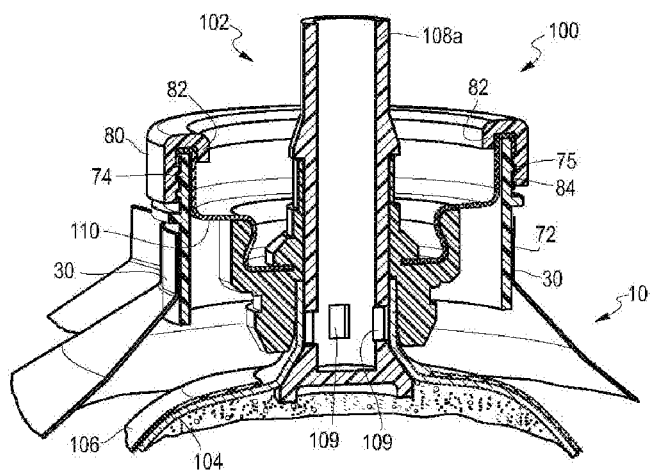
FIG. 13A is an enlarged view of Area 13A of FIG. 13.

In an embodiment, the valve assembly structure 102 can be of a different type such as a "whipped cream valve" or a "tilt valve" as shown in FIGS. 13, 13A. A tilt valve 108a can be tilted to the side causing the tilt valve 108a to open and allow fluid composition from bladder 104 to flow into holes 109 at the bottom of valve 108a. Other valve designs are possible as well.

FIG. 9 shows at position 'A' the bladder 104 attached to the valve seat 110. The bladder 104 is a flexible bag capable of holding a fluid composition to be dispensed, and capable of being placed in fluid communication with the valve 108. The bladder 104 is made from a material that is inert, or substantially inert, to the fluid composition contained therein. It is understood the bladder 104 may be attached to the valve 108 or the valve assembly structure 102 depending on the type of valve design.

In an embodiment, the bladder 104 is attached to the valve 108 (or 108a) at a point above any holes 109 (if present) in the bottom of the valve 108 (or 108a).

In an embodiment, the SBoV includes a tubular stem (not shown). The stem is a straw-like structure; located in the interior of the bladder 104. The stem has opposing ends with a proximate end in fluid communication with the valve 108. The other end, a distal end of the stem, is located near the bottom of the bladder 104. Provision of the stem promotes discharge of the entire content of fluid composition from the bladder and prevents fluid composition from being trapped in an evacuated, or partially evacuated bladder 104.

In FIG. 9, position 'B' shows the elastic sleeve 106. The elastic sleeve 106 is a tube-like structure made of an elastomeric material. An "elastomeric material," as used herein, is a material that can be stretched with the application of stress to at least twice its length and after release of the stress, returns to its approximate original dimensions and shape. The elastomeric material may, or may not, be a vulcanized or cross-linked or grafted material. Nonlimiting examples of suitable elastomeric material include ethylene copolymers (like ENGAGE™), ethylene olefin block copolymers (like INFUSE™), ethylene propylene diene monomer terpolymer (EPDM such as NORDEL™ EPDM polymers), ethylene propylene (EPM), nitrile rubber, hydrogenated nitrile butadiene rubber (HNBR), polyacrylic rubber, silicone rubber, fluorosilicone rubber, fluoroelastomers, perfluoro rubber, natural rubber (i.e., natural polyisoprene), synthetic polyisoprene, chloropene, polychloroprene, neoprene, halogenated or non-halogenated butyl rubber (copolymer of isobutylene and isoprene), styrene-butadiene rubber, epichlorohydrin, polyether block amides, chlorosulfonated polyethylene, and any combination of the foregoing. Elastomer additives known in the art to be provide benefit such as antioxidant and processing stabilizers, antiblocks, crosslink agents such as peroxides, accelerators, fillers including organoclays and nanoclays, carbon black, etc. can be included in the elastomer composition.

The elastic sleeve 106 is sized and shaped to be able to contain the bladder 104 and to exert pressure on bladder 104 when the bladder 104 is filled with fluid composition to be dispensed. The elastic sleeve 106 may or may not have a uniform thickness. The elastic sleeve 106 may or may not impart uniform pressure during the discharge cycle of fluid composition from the bladder 104. In an embodiment, the elastic sleeve 106 provides even pressure during the entire dispensing cycle (bladder filled with fluid composition to bladder emptied of fluid composition). The elastic sleeve 106 also provides positive pressure on the bladder after dispensing ensuring complete discharge of all, or substantially all, fluid composition from the bladder 104. The elastic sleeve 106 may or may not be open on top and bottom. The elastic sleeve 106 may be longer than the bladder 104 to ensure emptying of all the contents in bladder 104.

In an embodiment, the elastic sleeve 106 is closed at the bottom (as shown in FIG. 10).

In an embodiment, the elastic sleeve 106 is attached to the valve seat (not shown) or attached to the bottom of the valve 108 at an appropriate position as not to alter or impede any of the valve mechanisms. When the elastic sleeve 106 is closed at the bottom and the elastic sleeve 106 is attached to the valve assembly structure 102 in this manner, the elastic sleeve 106 serves as a secondary container for the product.

At position 'C' in FIG. 9, the elastic sleeve 106 is shown enclosing the bladder 104, thereby forming the sleeve and bag-on-valve assembly 100 (SBoV 100). After inserting the SBoV 100 into the flexible container 10 and attaching the valve seat 110 to the fitment 70, the bladder 104 may be filled with a fluid composition. Once the bladder 104 is filled with the elastic sleeve 106 in place, the elastic sleeve 106 exerts a radial pressure on the bladder 104 by virtue of its elasticity. In an embodiment, the elastic sleeve 106 is closed on one end and is shorter than the bladder 104 in its resting state. When fluid composition is loaded into the bladder 104, the bladder 104 is then extended axially as well as radially to exert pressure in two modes upon the body 47.

For illustrative purposes, FIG. 10 demonstrates the SBoV 100 after the bladder 104 has been filled with a fluid composition. FIG. 10 shows the elastic sleeve 106 stretched with the bladder 104 holding a fluid composition and the elastic sleeve 106 applying pressure. It is understood that the SBoV 100 is typically first inserted through the fitment 70 and into the body 47 interior prior to loading the fluid composition into the bladder 104.

The fluid composition (for dispensing from the bladder 104) is a substance that is fluidly deliverable when dispensed under compressive pressure by the elastic sleeve 106, the fluid composition flowing out of the bladder 104 under pressure when the valve 108 (or 108a) is opened. The fluid composition can be a liquid, a paste, a foam, a powder, or any combination thereof. Nonlimiting examples of suitable fluid compositions include:

food products, such as mayonnaise, ketchup, mustard, sauces, desserts (e.g., whipped cream), spreads, oil, pastry components, grease, butter, margarine, sauces, baby food, salad dressing, condiments, beverages, and syrup;

personal care products such as cosmetics creams, lotions, skin care products, hair gels, personal care gel, liquid soap, liquid shampoo, sun care products, shaving cream, deodorant and toothpaste;

medicaments, pharmaceutical and medical products such as medications (including dosage packages) and ointments, and oral and nasal sprays;

household products such as polishes; glass, bathroom, furniture and other cleaners; insecticides; and air fresheners; and industrial products such as paints, lacquers, glues, grease and other lubricants, oil sealants, pastes, and chemicals.

4. SBoV Attached to Fitment

The present flexible container includes the sleeve and bag-on-valve (SBoV) assembly 100 wherein the valve seat 110 is attached to the fitment 70. In an embodiment, the bladder 104 is wrapped around itself and contained in the elastic sleeve 106, in an empty configuration. The diameter of the empty SBoV is small enough such that the bladder 104 and the elastic sleeve 106 readily pass through the fitment 70. The SBoV 100 is inserted into the fitment 70, first through the top portion 74 and then through the base 72.

Figure 12:
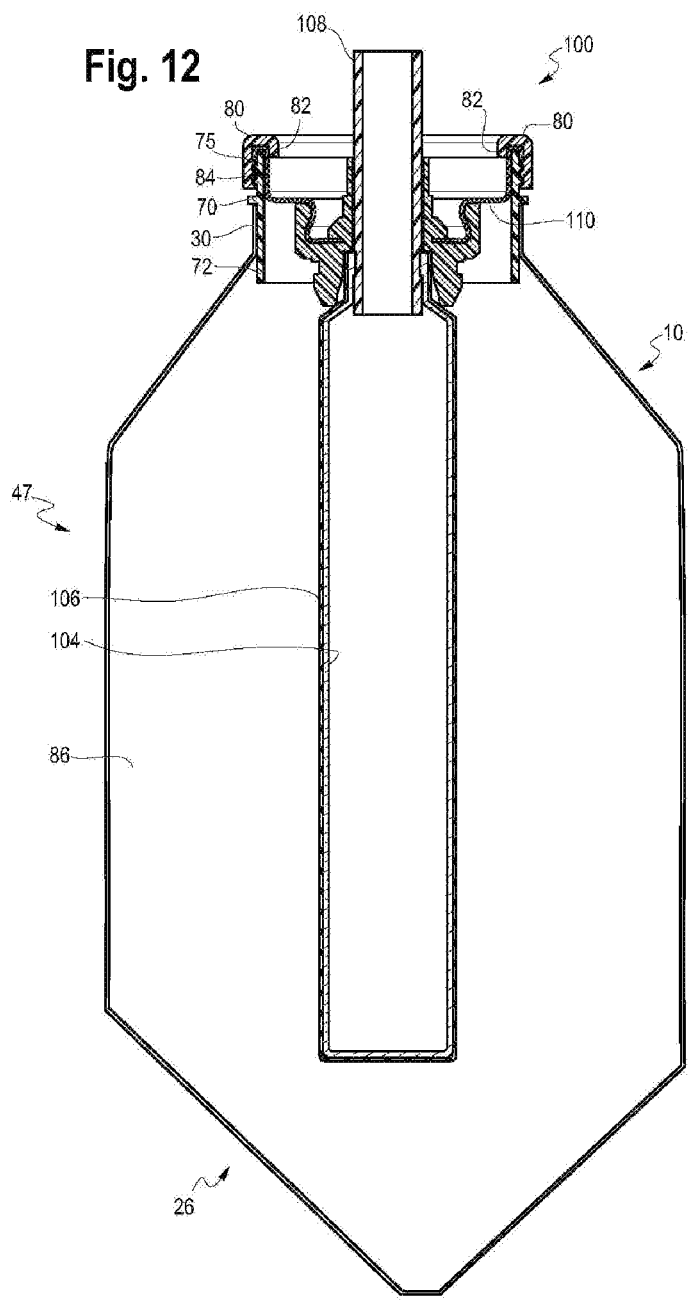
FIG. 12 is a sectional view of the flexible container of FIG. 11 taken along line 12-12 of FIG. 11.

In an embodiment, a flexible container 10 includes a retaining ring 80 for attaching the SBoV 100 to the fitment 70. FIGS. 12, 13, and 13A show a retaining ring 80 that is annular in shape. The retaining ring 80 includes an inner lip 82 for contacting an upper and inner portion of the valve seat 110. Downward rotation of the retaining ring 80 onto the fitment 70, engages the fitment threads 75 with retaining ring threads 84. The threaded engagement between fitment threads 75 and retaining ring threads 84 impinges the retaining ring lip 82 against the valve seat 110 as shown in FIGS. 12, 13, and 13A. The valve seat 110 becomes firmly sandwiched between the retaining ring lip 82 and the fitment 70. In other words, the valve seat 110 is sandwiched within the threaded engagement (threads 75, 84) between the fitment 70 and the retaining ring 80. The retaining ring 80 thereby forms a seal between the fitment 70 and the valve seat 110. In this way, the retaining ring 80 attaches, or otherwise secures, the fitment 70 to the valve seat 110.

In an embodiment, one or more gaskets are located (not shown), or otherwise are disposed, between the retaining ring 80 and the fitment 70. The gasket(s) can be (i) located between the retaining ring 80 and the valve seat 110, (ii) located between the valve seat 110 and the fitment 70, and (iii) located at both (i) and (ii). The gasket(s) is composed of a resilient material that closes any gaps in the mated engagement between the retaining ring 80 and the fitment 70. In a further embodiment, the gasket(s) forms a hermetic seal between the retaining ring 80, the valve seat 110, and the fitment 70.

In an embodiment, neither the fitment 70 nor the retaining ring 80 has threads. Attachment occurs by way of snap-on fit of the retaining ring 80 over the valve seat 110 and onto the fitment 70. The snap-on engagement between the fitment 70 and the retaining ring 80 firmly sandwiches the valve seat 110 between the retaining ring 80 and the fitment 70 to produce a hermetic seal. The snap-on engagement between the fitment 70 and the retaining ring 80 can include one or more gaskets as previously discussed.

FIG. 13 shows flexible container 10 with a fluid composition 90 present in the bladder 104. With the fluid composition 90 present in the interior of the bladder 104, the mass and volume of the SBoV 100 moves the flexible container 10 from a collapsed configuration (FIGS. 11, 12) to an expanded configuration, shown in FIG. 13. As shown in FIG. 13, the bottom segment 26 of the body 47 rests on a support surface and supports the bottom of the filled bladder 104. The panels 18, 20, 22, 24 of the body 47 and the neck 30 provide sufficient strength and rigidity to maintain, or otherwise hold, the filled bladder 104 in a vertical position, or in a substantially vertical position. The flexible container 10 holds the filled bladder 104 in an upright position. Therefore, in an embodiment, the flexible container 10 with SBoV is a "stand-up container" (sometimes referred to as a stand-up pouch or "SUP").

Figure 15:
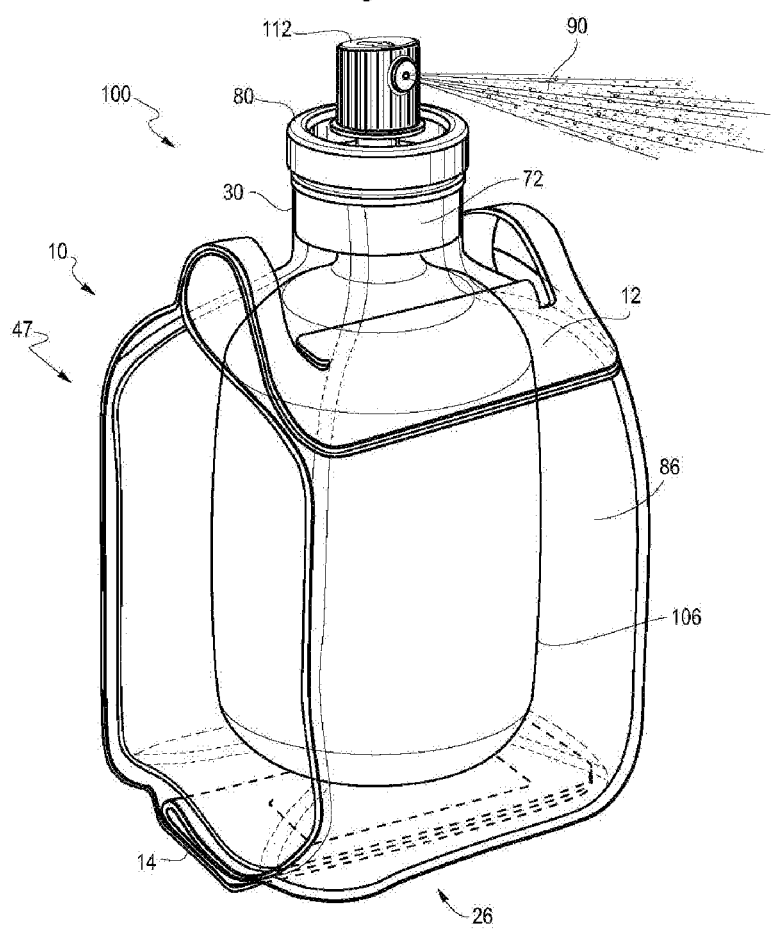
FIG. 15 is a perspective view of the flexible container with a fluid composition present in the sleeve and bag-on-valve assembly in accordance with an embodiment of the present disclosure.

The body 47 defines a body interior (or interior) 86 for the flexible container 10. In an embodiment, the flexible container 10 is hermetically sealed and the interior 86 is filled with a pressurized gas (air, nitrogen, carbon dioxide) before the bladder 104 is filled with the fluid composition. The pressurized gas is at a pressure from 1 atmosphere (atm) to 2 atm. The pressurized gas helps the flexible container 10 maintain a stand-up shape during the entire delivery cycle of the SBoV (from full bladder 104 to complete, or substantially complete, emptying of fluid composition from the bladder 104) and as shown in FIG. 15.

In an embodiment, the flexible container 10 is hermetically sealed with 0.1 atm to 0.9 atm pressure (vacuum) before filling the bladder 104 with the fluid composition 90. This configuration promotes evacuation of the fluid composition 90 during product use and indicates remaining product.

5. SBoV and No Fitment

The present disclosure provides another flexible container. In an embodiment, a flexible container is provided and includes (A) four panels, each panel formed from a flexible multilayer film. The flexible multilayer film is composed of one or more polymeric materials. The four panels form (i) a body, and (ii) a neck. The flexible container includes (B) a fitment. The fitment includes a top portion and a base. The base is composed of a polymeric material. The base is sealed in the neck. The flexible container includes (C) a sleeve and bag-on-valve assembly (SBoV). The SBoV includes a valve seat, a pouch, and an elastic sleeve. (D) The pouch and elastic sleeve are inserted through the fitment and located in the body. (E) The valve seat is composed of a polymeric material. (F) A heat seal attaches the valve seat to the fitment.

Figure 14:
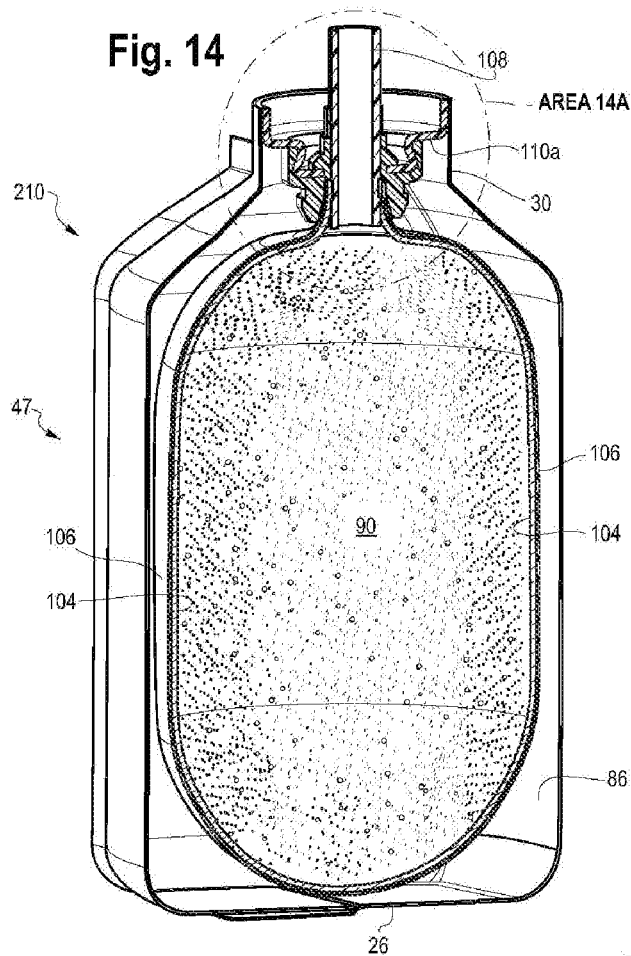
FIG. 14 is a sectional view of a flexible container in accordance with another embodiment of the present disclosure.
Figure 14A:
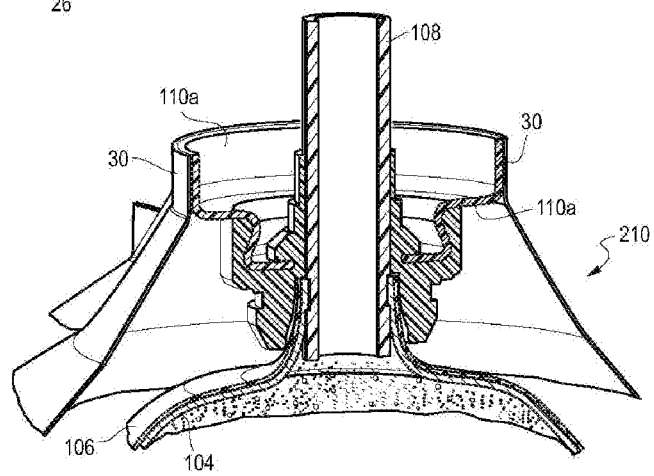
FIG. 14A is an enlarged view of Area 14A of FIG. 14.

FIGS. 14 and 14A show flexible container 210 with a SBoV. The flexible container can be any flexible container as previously disclosed herein. The SBoV can be any SBoV as previously disclosed herein. In an embodiment, the SBoV 100a includes a valve seat 110a that is made of a polymeric material. The polymeric material of the valve seat 110a is compatible with the seal layer of the multilayer film. The seal layer of the flexible multilayer film of the panels is heat sealed directly to the valve seat 110a. In other words, a heat seal is formed, or is otherwise present, between the seal layer of the panels of the neck 30 and the polymeric material of the valve seat 110a.

In this embodiment, no fitment 70 is present. Rather, the valve seat 110a operates as both the fitment and the seat for the valve assembly. This embodiment advantageously avoids the need for a fitment, reducing material cost and reducing the weight of the flexible container 210.

In an embodiment, the present flexible container (10, 210) maintains its shape, not collapsing or changing dimensions or appearance as the fluid composition 90 is expelled from the bladder 104 (creating internal vacuum) unless desired as a means to indicate the amount of product remaining.

In an embodiment, the present flexible container (10, 210) provides sufficient support such that the flexible container does not move when the valve 108 (or 108a) is actuated and fluid composition 90 is expelled through the valve 108 (or 108a). In another embodiment, this support for the container is supplied by the fitment having a wall thickness greater than the container film panels or the valve seat 110a. It is envisioned that a person can grasp the neck 30 or fitment 70 between thumb and middle finger and then activate the value 108 (or 108a) for the product delivery, for example, by pressing a spray cap 112 with the index finger of the same hand (FIG. 15). It is also envisioned, that the fitment 70 can have a machine grabbing support ridge between base 72 and top portion 74, such as shown in FIG. 7, in order to aid in the filling and handling of the flexible containers using automatic equipment.

In an embodiment, the present flexible container (10, 210) includes at least one handle 12, 14 for securing the container during filling of the bladder 104. The handle 12, 14 provides the ability to grab and hold the flexible container. In this way, the present flexible container with attached SBoV can be filled with conventional aerosol-type filling systems.

The present flexible container 10, 210 enables the load of contents without creating an odd-shaped or distorted container. The present flexible container loads evenly about the longitudinal axis of the bladder 104 such that the final shape of the filled bladder 104 resembles a uniform, or substantially uniform, cylinder.

The valves can also have various types of actuators or spray caps fastened to them in order to deliver product in the desired manner including but not limited to fluid stream, gel, lotion, cream, foam or fluid spray or mist.

Definitions

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

Clarity is measured in accordance with ASTM-D1746.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792.

An "ethylene-based polymer," as used herein is a polymer that contains more than 50 mole percent polymerized ethylene monomer (based on the total amount of polymerizable monomers) and, optionally, may contain at least one comonomer.

Haze is measured in accordance with ASTM D1003 (method B) and noting the thickness of the part.

The term "heat seal initiation temperature," is minimum sealing temperature required to form a seal of significant strength, in this case, 2 lb/in (8.8N/25.4 mm). The seal is performed in a Topwave HT tester with 0.5 seconds dwell time at 2.7 bar (40 psi) seal bar pressure. The sealed specimen is tested in an Instron Tensioner at 10 in/min (4.2 mm/sec or 250 mm/min).

Melt flow rate (MFR) is measured I accordance with ASTM D 1238, Condition 280° C./2.16 kg (g/10 minutes).

Melt index (MI) is measured in accordance with ASTM D 1238, Condition 190° C./2.16 kg (g/10 minutes).

Tm or "melting point" as used herein (also referred to as a melting peak in reference to the shape of the plotted DSC curve) is typically measured by the DSC (Differential Scanning Calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. A flexible container comprising:
 (A) four panels, each panel formed from a flexible multilayer film composed of one or more polymeric materials, the four panels forming
  (i) a body, and
  (ii) a neck;

(B) a fitment comprising a top portion and a base, the base composed of a polymeric material, the base sealed in the neck; and
(C) a sleeve and bag-on-valve assembly (SBoV) comprising a valve seat, a bladder, and an elastic sleeve;
(D) the bladder and the elastic sleeve inserted through the fitment and located in the body; and
(E) the valve seat is attached to the fitment.

2. The flexible container of claim 1 comprising a retaining ring for attaching the valve seat to the fitment.

3. The flexible container of claim 2 wherein the valve seat is sandwiched within a threaded engagement between the retaining ring and the fitment.

4. The flexible container of claim 2 wherein the valve seat is sandwiched within a snap-on engagement between the retaining ring and the fitment.

5. The flexible container of claim 2 wherein the retaining ring forms a hermetic seal between the valve seat and the fitment.

6. The flexible container of claim 1 wherein the bladder is hermetically sealed to the valve assembly.

7. The flexible container of claim 1 wherein the flexible container comprises a front panel, a back panel, a first gusset panel, a second gusset panel, and a bottom segment; and
the panels and the bottom segment support the flexible container in an upright position when the bladder contains a fluid composition for dispensing.

8. The flexible container of claim 1 wherein the flexible container comprises a plurality of peripheral heat seals.

9. The flexible container of claim 1 wherein the base has a circular cross section with a diameter (d) and a wall thickness (WT), wherein the d/WT ratio (in mm) is from 5 to 450.

10. The flexible container of claim 1 wherein the fitment is composed of an ethylene/α-olefin multi-block copolymer.

11. The flexible container of claim 1 wherein the flexible container comprises at least one handle.

12. A flexible container comprising:
(A) four panels, each panel formed from a flexible multilayer film composed of one or more polymeric materials, the four panels forming
   (i) a body, and
   (ii) a neck;
(B) a fitment comprising a top portion and a base, the base composed of a polymeric material, the base sealed in the neck; and
(C) a sleeve and bag-on-valve assembly (SBoV) comprising a valve seat, a bladder, and an elastic sleeve;
(D) the bladder and the elastic sleeve inserted through the fitment and located in the body;
(E) the valve seat is composed of a polymeric material; and
(F) a heat seal attaches the valve seat to the fitment.

13. The flexible container of claim 1 wherein the body defines a body interior; and
the flexible container is hermetically sealed with a pressurized gas in the body interior before the bladder is filled with a fluid composition, and the pressurized gas is at a pressure from 1 atm to 2 atm.

14. The flexible container of claim 1 wherein the body defines a body interior; and
the flexible container is hermetically sealed with a vacuum before the bladder is filled with a fluid composition, and the vacuum is at a pressure from 0.1 atm to 0.9 atm.

* * * * *